United States Patent
Kezys et al.

(10) Patent No.: US 7,773,561 B2
(45) Date of Patent: Aug. 10, 2010

(54) APPARATUS, AND AN ASSOCIATED METHOD, FOR PRESERVING COMMUNICATION SERVICE QUALITY LEVELS DURING HAND-OFF OF COMMUNICATIONS IN A RADIO COMMUNICATION SYSTEM

(75) Inventors: Vytautus Robertas Kezys, Hamilton (CA); Craig William Thornton, Hamilton (CA)

(73) Assignee: Research In Motion Limited, Waterloo (CA)

( * ) Notice: Subject to any disclaimer, the term of this patent is extended or adjusted under 35 U.S.C. 154(b) by 1556 days.

(21) Appl. No.: 10/915,994

(22) Filed: Aug. 11, 2004

(65) Prior Publication Data

US 2005/0036459 A1 Feb. 17, 2005

(30) Foreign Application Priority Data

Aug. 15, 2003 (WO) .............. PCT/GB03/003576

(51) Int. Cl.
*H04W 4/00* (2009.01)
*H04W 36/00* (2009.01)

(52) U.S. Cl. .................... 370/331; 455/436
(58) Field of Classification Search ........ 370/331, 370/328, 338; 455/436, 437, 442
See application file for complete search history.

(56) References Cited

U.S. PATENT DOCUMENTS

| | | | |
|---|---|---|---|
| 5,182,753 A * | 1/1993 | Dahlin et al. ............. 714/749 |
| 6,163,547 A * | 12/2000 | De Vriendt et al. ......... 370/466 |
| 6,226,515 B1 * | 5/2001 | Pauli et al. ............... 455/426.1 |
| 6,501,953 B1 * | 12/2002 | Braun et al. ............... 455/436 |
| 6,535,737 B1 * | 3/2003 | Karlsson .................. 455/434 |
| 6,549,523 B1 * | 4/2003 | Gibbs et al. ............... 370/331 |
| 6,639,908 B1 * | 10/2003 | Silventoinen et al. ....... 370/345 |
| 6,731,614 B1 * | 5/2004 | Ohlson et al. ............. 370/320 |
| 6,920,289 B2 * | 7/2005 | Zimmerman ............... 398/118 |
| 6,993,283 B1 * | 1/2006 | Ka Ming et al. ........... 455/3.01 |
| 6,993,332 B2 * | 1/2006 | Pedersen et al. ........... 455/436 |

(Continued)

OTHER PUBLICATIONS

Packetvideo Corporation: PacketVideo Multimedia Technology Overview, Standards, Algorithms, and Implementations, Revision Feb. 28, 2001, BNSDOCID: <XP_2968316A_I_>, pp. 1-16.

(Continued)

*Primary Examiner*—George Eng
*Assistant Examiner*—Christopher M Brandt
(74) *Attorney, Agent, or Firm*—Jones Day; Krishna K. Pathiyal; Robert C. Liang

(57) ABSTRACT

Apparatus, and an associated method, that preserves the service quality level of data communications in a radio communication system in which communications are handed off between access points, or other fixed-site entities. Data stuffing operations are performed by a data sequence expander prior to effectuation of hand over period during a service interruption during the handoff of communications of a data, containing the extra data is played out in real time, and the service interruption is less noticeable.

20 Claims, 5 Drawing Sheets

U.S. PATENT DOCUMENTS

| | | | |
|---|---|---|---|
| 7,296,091 B1* | 11/2007 | Dutta et al. | 709/245 |
| 7,440,430 B1* | 10/2008 | Jagadeesan et al. | 370/331 |
| 2002/0089935 A1 | 7/2002 | Chan et al. | |
| 2003/0174686 A1* | 9/2003 | Willenegger et al. | 370/342 |
| 2004/0028009 A1* | 2/2004 | Dorenbosch et al. | 370/329 |

OTHER PUBLICATIONS

Huang, Chung-Ming, et al.: Handoff Architectures and Protocols for Transmitting Compressed Multimedia Information in Mobile PCSs, IEEE Transactions on Consumer Electronics, vol. 43, No. 3, Aug. 1997, BNSDOCID: <XP_742562A_I_>, pp. 784-794.

Meky, Mohamed M., et al.: Degradation Effect of Cell Loss on Speech Quality Over ATM Networks, The City University of New York, BNSDOCID: <XP_10525727A_I_>, pp. 259-270.

Benslimane, Abderrahim: Multimedia Multicast in Mobile Computing, Universite de Technologie de Belfort-Montbeliard, Belfort Cedex France, BNSDOCID: <XP_10528749A_I_>, pp. 339-346, 2001.

* cited by examiner

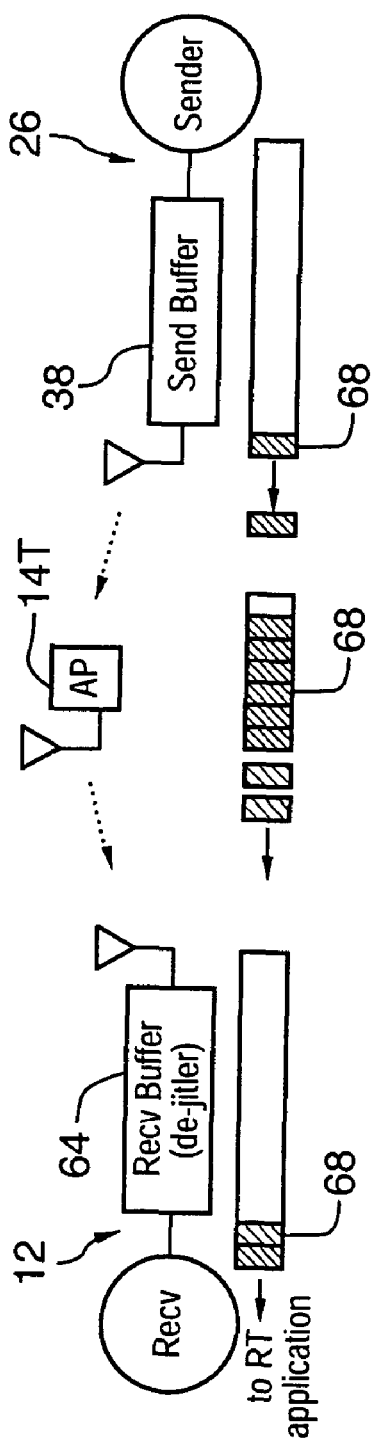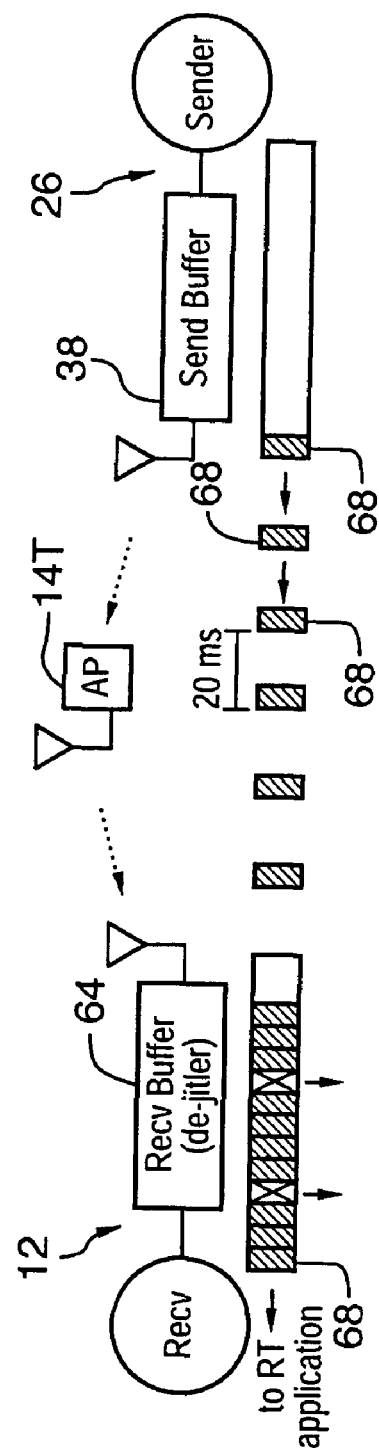
FIG.3-4    FIG.3-5

APPARATUS, AND AN ASSOCIATED METHOD, FOR PRESERVING COMMUNICATION SERVICE QUALITY LEVELS DURING HAND-OFF OF COMMUNICATIONS IN A RADIO COMMUNICATION SYSTEM

The present invention relates generally to a manner by which to preserve service quality levels of communications of real time data streams in a radio communication system during handoff of communications between serving and target entities. More particularly, the present invention relates to apparatus, and an associated method, by which to add to, i.e. stuff, a sequence of communication data symbols forming a real time data stream with extra data symbols. The sequence is communicated as a real time stream during the handoff of communication.

Brief service interruption during handoff that would otherwise be noticeable in playing out of the real time stream is less likely to be noticed. By stuffing the sequence with the extra data symbols, the sequence, when acted upon by a receiving node, plays out as a real time stream. When the extra data symbols correspond in length at least with the length of the service interruption, appearance of the service interruption is not noticed at a receiving node.

BACKGROUND OF THE INVENTION

The need to communicate is an endemic need of modern society. Data must be communicated, sometimes between very widely spaced apart locations, to effectuate many varied communication services. Communication systems are used to effectuate the communication of the data. A communication system is formed, at minimum, of a sending station and receiving station interconnected by way of a communication channel. Many different types of communication systems have been developed and deployed through which to effectuate many different types of communication services.

As technological advancement warrants, new types of communication systems have been developed and deployed. Technological advancements continue and communication systems that embody such advancements continue to be deployed.

Many modern communication systems utilize digital communication techniques. Digital communication techniques provide several inherent advantages over analog communication techniques. Perhaps most significantly, increased communication efficiency is possible through the use of digital communication techniques. And, as result, the communication capacity of a communication system that utilizes digital communication technique is generally significantly greater than the communication capacity available to a corresponding communication system that utilizes analog communication techniques.

A radio communication system is a type of communication system in which the communication channels interconnecting the communication stations thereof form radio channels, defined upon a radio air interface extending there between. The infrastructure required to implement a radio communication system is generally less than that required of a corresponding wireline counter part. And, the cost required to deploy the infrastructure of the radio communication system is generally less than the corresponding cost to deploy the wireline counterpart. Additionally, a radio communication system is amenable for implementation as a mobile communication system in which mobility of communication is provided.

A cellular communication system is a type of radio communication system. The network infrastructures of cellular communication systems have been deployed over significant portions of the populated areas of the world. Successive generations of cellular communication systems have been developed and deployed. And, successor generation systems are undergoing deployment or standardization.

Other wireless networks have also been deployed, sometimes incorporating various aspects of cellular communication systems. For instance, wireless local area networks (WLANs) as well as wider-area, wide area networks (WANs) are increasingly being used to communicate data, both voice data and non-voice data. An IEEE (Institute of Electrical and Electronic Engineers) 802.11 standard, and variants thereof, defines operating parameters by which many wireless LANs are operable. WLANs are implemented at both licensed and non-licensed bands of the electromagnetic spectrum. When a user has a choice of communicating by way of a commercial, cellular communication system and a private WLAN, use of a private WLAN is sometimes preferred for the reason that communication costs associated with the private network are generally less than corresponding costs to communicate by way of a commercial cellular communication system.

Some wireless local area networks provide for communication hand offs to permit continuation of communications with a mobile node as the mobile node travels throughout an area encompassed by a plurality of fixed site radio transceivers, sometimes referred to as access points (APs). Sometimes brief service interruptions occur when the communications are handed off from a serving access point to a target access point. That is to say, the serving access point is disassociated with the communications, and the target access point becomes associated with the communications. When the communication of the data is not time sensitive, the brief service interruption is usually insignificant. However, when the communication of the data is time sensitive, such as when the communication service forms a telephonic voice communication, the interruption is noticeable and potentially reduces the quality of service (QoS) of the communication session.

As an example, the service interruption, i.e., the period of time during which a channel is unavailable to communicate the data, might be as long as 300 ms. If the packets of the data communication are of lengths such that the packets are communicated once every 20 ms, then, for a 300 ms interruption, approximately 15 real time packets are delayed or dropped during the handoff of communication. As the communication range of an access point might be 30 meters, or less, multiple handoffs between successive access points might be required during a single communication session. Repeated service interruptions, and their noticeable effects might well have a compounding effect on a user perception of the quality of the communications as well as a quantitative QoS level.

A manner by which to preserve the quality of service level of communications during hand-off of the communications between source and target access points, or other entities, would therefore be beneficial.

It is in light of this background information related to communication handoff procedures that the significant improvements of the present invention have evolved.

SUMMARY OF THE INVENTION

The present invention, accordingly, advantageously provides apparatus, and an associated method, by which to preserve service quality levels of communications in a radio communication system during handoff of communication between serving and target entities.

Through operation of an embodiment of the present invention, a manner is provided by which to stuff extra data symbols into a sequence of communication data symbols that is to be communicated as a real time data stream during handoff of communication between the source and target entities.

Connection delays resulting in service interruptions that would otherwise be noticeable in playing out of the real time stream are less likely to be noticed by a user of a receiving node. The extra data symbols form part of the sequence that is played out at the receiving node as the communications are handed off from the serving entity to the target entity. That is to say, by stuffing the sequence with the extra data symbols, the sequence, when acted upon by a receiving node, plays out as a real time stream. When the extra data symbols are added in numbers to be of a length at least as great as the length of the service interruption, the service interruption is not noticed at the real time node. Quality of service levels are not adversely affected as they would otherwise be if no compensation were made for the service interruption.

In one aspect of the present invention, data stuffing operations are commenced prior to handoff of communication from the serving entity to the target entity. Detection is made of the pendency of the handoff of communication. For instance, pendency of the handoff of communications is detected as a result of mobile node signal strength, or other appropriate signal indicia measurements made during otherwise normal operation of a mobile node. Or, indications of the pendency of the handoff of communications are, alternately, provided by the network infrastructure of the communication system. Preemptive detection of the handoff thereby initiates the data stuffing operations.

In another aspect of the present invention, a de-jitter buffer is used at which to buffer data symbols of a communication sequence that is communicated pursuant to effectuation of a communication service. The data sequence buffered thereat is stuffed with additional data symbols, collectively to increase the length of the sequence. Through appropriate selection of the number of additional data symbols to be stuffed into the sequence, brief service interruption is compensated for by the additional data symbols added to the sequence. When, for instance, the additional data symbols added to the sequence are of lengths that together are at least as great as the service interruption during handoff, the noticeable effects of a connection interruption are not noticed by a user of the receiving node.

The de-jitter buffer is embodied, for instance, at a proxy device coupled to the network part of the communication system. When a proxy device is utilized, the proxy device functions as an intermediary between a mobile node and a correspondent node. The correspondent node is, for instance, an "unaware" node. That is to say, the correspondent node need not be aware of the handoff of communications. A data sequence originated at the mobile node is communicated by way of the radio air interface and delivered to the proxy device. At the proxy device, the data sequence is buffered, and the additional data symbols are added thereto. Alternately, the additional data symbols are added to the sequence at the mobile node. And, when data is originated at correspondent node for communication to the mobile node, the data is delivered to the proxy device whereat the additional data symbols are added to the data sequence, prior to forwarding of the data sequence on to the mobile node. The additional data symbols alternately are added to the data sequence once delivered to the mobile node.

In an implementation in which the de-jitter buffer is embodied at the mobile node, the data stuffing operations are performed entirely at the mobile node. Upon detection of the pendency of a handoff of communication, data sequences that are expected to be communicated during the handoff are stuffed with the additional data symbols.

A functional entity, a data sequence expander, is utilized to add the data symbols to the data sequence. During operation, selection is made as to the number of data symbols that are to be added to the data sequence. In an exemplary implementation, the number of data symbols added to the sequence corresponds to the length of time of the expected service interruption. And, the expander also selects the manner by which the data sequence is expanded. In one implementation, the data symbols that are added to the data sequence are copies of data symbols contained in the data sequence. And, in the exemplary implementation, the data symbols that are selected to be copied and stuffed into the data sequence correspond to silent data symbols. That is to say, the data symbols that are selected to be stuffed into the data sequence are of symbol values corresponding to periods of silence in the data sequence. And, the data sequence expander further selects at where in the data sequence that the data symbols are added. In the implementation in which the additional data symbols correspond to silent periods, the additional data symbols are stuffed into portion of the data sequence that are of symbol values corresponding to silent periods. Thereby, the delay added to the data sequence is least likely to be detected by a user of a receiving node.

In another aspect of the present invention, unstuffing operations are performed to return the data communication operations to normal subsequent to the handoff of the communications. That is to say, the delays introduced into the communications by the stuffing of the additional data symbols into the data sequence are removed by unstuffing operation. The unstuffing procedure acts to compress the real time data stream, i.e., the sequence of data is compressed to return the delay back to normal. In one implementation, a data sequence compressor is utilized to identify packets that are unstuffed, or otherwise not played out in real time, upon completion of the handoff procedure and the communication of the data continues normally. The data unstuffing is performed at a proxy device in an implementation that utilizes a proxy device formed in part of the network infrastructure of the communication system. And, in an other implementation, the unstuffing is performed at the mobile node.

Thereby, a manner is provided by which to preserve the service quality level of communications between communicating nodes of a radio communication system during handoff of communication from a serving entity to a target entity. The procedures are performable with an unaware node, that is, a node that is unaware of the handoff of communications. Thereby, only a mobile node, forming one of the nodes of the communicating nodes, is aware of the handoff of communications.

In these and other aspects, therefore, apparatus, and an associated method, is provided for a communication system. The communication system has a mobile node that communicates a first sequence of communication data symbols pursuant to effectuation of a communication service with a network part. The network part has a serving access point with which the mobile node initially communicates and at least a first target access point with which communications continue subsequent to handoff of communications thereto. Improved perceived service quality levels of communications are facilitated during handoff of the communications from the serving access point to the target access point. A data sequence expander is adapted to receive indications of pendency of the handoff of the communications and to receive representations of the first sequence of the communication data symbols communicated pursuant to the effectuation of the communication service. The data sequence expander is selectably for adding expanded data symbols to the first sequence of the communication data symbols responsive to detection of the indication of the pendency of the handoff of the communication, thereby to form a first expanded sequence.

A more complete appreciation of the present invention and the scope thereof can be obtained from the accompanying drawings that are briefly summarized below, the following descriptions of the presently-preferred embodiments of the invention, and the appended claims.

BRIEF DESCRIPTION OF THE DRAWINGS

FIGS. 2-1, 2-2, 2-3, 2-4, and 2-5 illustrate representations of stuffing operations performed during operation of an embodiment of the present invention.

FIGS. 3-1, 3-2, 3-3, 3-4, and 3-5 illustrate representations, similar to those shown in FIG. 2, but here of unstuffing operation, also performed during operation of the embodiment of the present invention.

DETAILED DESCRIPTION

Figure 1:
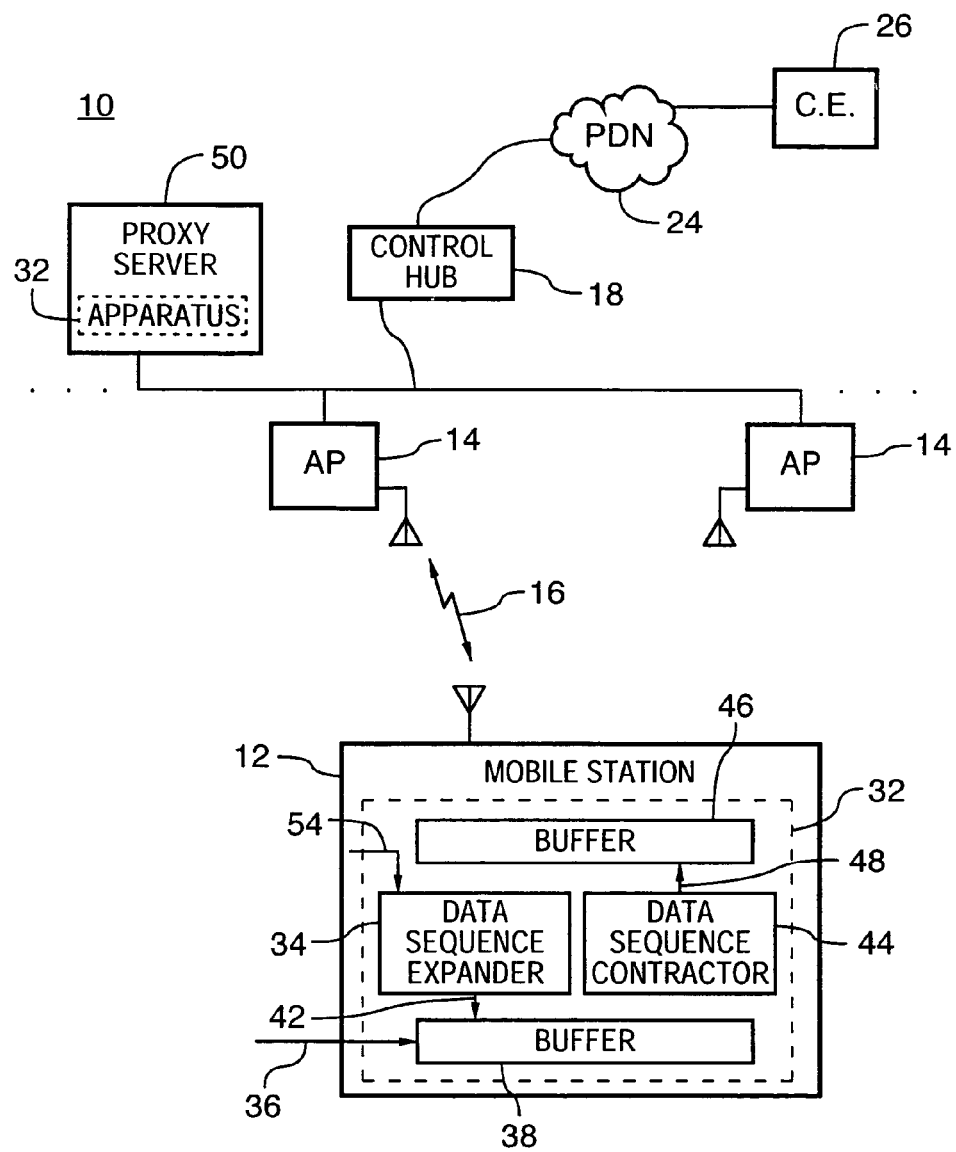
FIG. 1 illustrates a functional block diagram of a radio communication system in which an embodiment of the present invention is operable.

Referring first to FIG. 1, a communication system, showing a generally at 10, provides for radio communication with mobile station, of which the mobile station 12 is representative. And in the exemplary implementation, the radio communication system forms a WLAN (Wireless Local Area Network) that operates, generally, pursuant to a version of the IEEE (Institute of Electrical and the Electronic Engineer) 802.11 operating specification. The communication system is also representative of other types of communication systems, i.e. communication systems that are operable pursuant to other operating specifications. Accordingly, while operation of an embodiment of the present invention shall be described with respect to its implementation pursuant to the operating specification of the IEEE 802.11, or variant, standard, the teachings of the present invention are analogously applicable in other types of communication systems.

Data is communicated during operation of the communication system between a mobile station and network part of the communication system. And, more particularly, pursuant to a communication session, a mobile station communicates with a fixed-site radio transceiver, referred to as an access point (AP) 14, that forms part of the network portion of the communication system. The network portion includes a plurality of access points, of which two are shown in the Figure. The data is communicated by way of radio channel defined upon radio links, shown at 16, that extends between the mobile station and an access point. Data communicated by the mobile station to an access point of the network portion is sometimes referred to as being communicated on a reverse link channel. And, data communicated by an access point of the network portion to the mobile station is sometimes referred to as being communicated upon a forward link channel.

Each of the access points 14 of the network portion of the communication system defines a coverage area, sometimes referred to as a cell. When a mobile station is positioned within a cell associated with an access point, communications of the mobile station with the network portion of the communication system are generally effectuated with the access point that defines the cell within which the mobile station is positioned.

The network portion of the communication system also includes a control hub 18 to which the access points 14 are connected. The control hub operates, amongst other things, to control operation of the access point and, thereby, communications in the WLAN. The control hub is embodied, for instance, at a computer server. And, the control hub, in turn, is coupled to a packet data network (PDN) 24. The packet data network is, for instance, comprised of the Internet backbone. A correspondent entity (CE) 26 is representative of a communication device with which a mobile station 12 communicates during a communication session to effectuate a communication service. The correspondent entity is, course, positionable elsewhere, such as within the WLAN, or at another location of the communication network.

Due to the inherent mobility of a mobile station, the mobile station might travel out of the cell defined by one access point and into a cell defined by another access point. A communication handoff from a serving access point to a target access point is effectuated to permit continued communication with the mobile station as the mobile station travels out of one cell and into another cell. Pursuant to the handoff of communication between the access points, the mobile station deassociates with the serving access point and associates with the target access point.

As noted previously, a brief service interruption sometimes occurs during the handoff of communication between the access points. When the communication service forms a voice communication service, the connection interruption is noticeable, deleteriously affecting the QoS (Quality of Service) of the communication service. Pursuant to operation of an embodiment of the present invention, compensation is made for the service interruption, and the service quality level of the communication service is preserved.

Pursuant to operation of an embodiment of the present invention, apparatus 32 is utilized to selectably to stuff data into data packet communicated during a communication session and, specifically, in data packets that are to be communicated during handoff of communications between access points. The apparatus includes a data sequence expander 34 that operates selectably to stuff data bits into data packets that are communicated to effectuate a communication service during operation of the communication system. Here, the data bits that form data packet are applied, here represented by way of the line 36, to a buffer 38. Extra data bits are selectably added by the data sequence expander, by way of the line 42, to the data buffered at the buffer 38. The apparatus further includes a data sequence contractor 44 that selectably removes data bits from data packets that are communicated over a radio air interface upon which data packets are communicated. Here, the data sequence contractor operates upon data buffered at a buffer 46, by way of the line 48. The buffer buffers data, subsequent to communication upon the radio air interface, and the data sequence contractor operates selectably to unstuff data packets that are stuffed with extra data bits.

In one implementation, and as shown, the apparatus is embodied at a mobile station. In another implementation, also as illustrated, the apparatus is embodied at a proxy device, here a proxy server 50, coupled to the WLAN, or elsewhere at the network portion of the communication system.

Stuffing operations performed by the apparatus are initiated responsive to preemptive detection of handoff of communications. Here, indications are provided, indicated by way of the line 54, of the pendency of the hand-off. Responsive to detection of such indication, the data sequence expander becomes operable to stuff data buffered at the buffer 38, forming a de-jitter buffer with the additional data bits. And, the data, once stuffed with the additional data bits, is caused to be communicated upon the radio air interface. And, the data is routed to the correspondent entity to be played out thereat.

When the apparatus is embodied at a proxy server, data stuffing operations are performed thereat. Data communicated on the reverse link by a mobile station is routed to the proxy server which the apparatus is embodied, and the extra data bits are stuffed. Therein, service interruptions upon the radio air interface during handoff of communications are compensated for, through the addition of the data bits at the apparatus embodied at the proxy server. That is to say, the data bits are added subsequent to service interruption on the radio air interface. When data is originated at the correspondent entity for communication to a mobile station, the data is routed to the proxy server whereat the extra data bits are added to thereto prior to communication upon the radio air interface.

The correspondent entity need not to be aware of the stuffing and unstuffing operations. By embodying the apparatus 32 at the proxy server at the mobile station, data stuffing and data unstuffing operations are performed without action required of the correspondent entity. The correspondent entity also need not know of the handoff of the communications between access points.

The service quality level of the communications is preserved as delays are slowly introduced into a real time data stream to make lost packets be less noticeable. The delay resulting from the addition of the additional data bits, forming delay bits, into the data stream is less noticeable. The apparatus 32 can also be used in communication systems that are also susceptible to communication interruptions, including in infrastructure-free, i.e., at-hoc wireless communication networks.

FIG. 2-1 through 2-5 illustrate exemplary operations of the apparatus 32, here in an implementation in which the apparatus is embodied at the mobile station, and data is communicated upon a reverse link from the mobile station to the correspondent entity. The buffer 38 is provided with data, here originated by a sender, i.e., data source, here represented at 62. An access point to which data is communicated by way of reverse link channel defined upon the radio link 16 is also shown. And, a correspondent entity, here a mobile, correspondent entity, referenced also at 26, is positioned to receive data communicated thereto by the mobile station 12. The correspondent entity includes a receive buffer 64 and a data destination, indicated at RECV 66. Packet flow of packets communicated during normal operation of the communication system is also showing in the Figure in which data packets 68 are sent at 20 millisecond intervals. The correspondent entity 26 here forms an unaware node, and communications of the data packets are communicated with minimal buffering as communications here are effectuated upon a reliable radio link. And, again, the communication system is operated in an infrastructure mode in which communications are effectuated by way of a network portion of the communication system.

Figure 2:
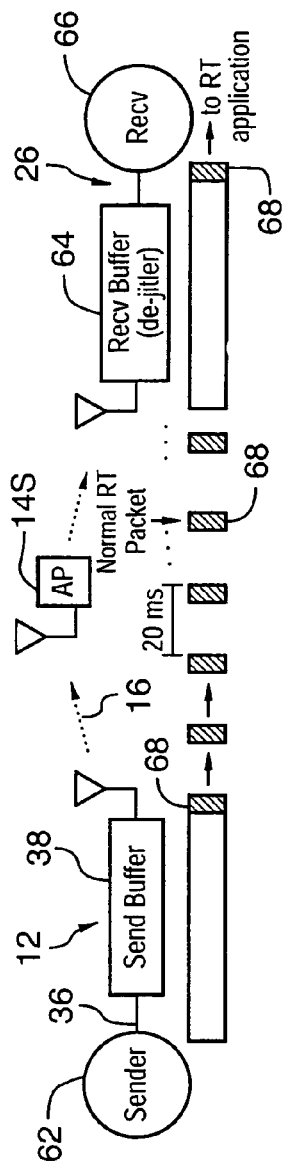
Figure 1:
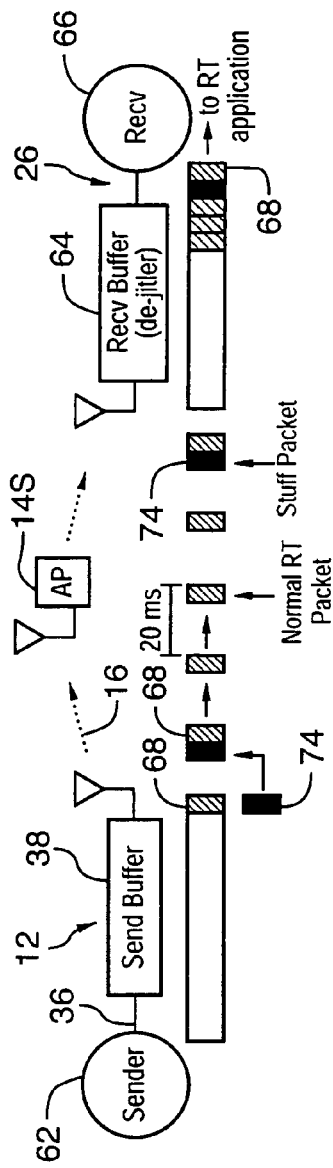

FIG. 2-2 represents operation upon detection of pendency of a communication handoff from a source access point to a target access point. Data stuffing operations commence. A real-time, quality of service (RT QoS) protocol approximates the amount of time required prior to occurrence of handoff of communications, and the real time delay is started to be slowly stretched by inserting delay packets, here indicated at 74, into the real time data packet stream formed of the data packet 68. If, for instance, a typical 802.11 handoff takes roughly 300 ms, and extra 15 data packets are stuffed into the receive buffer 64 of the correspondent entity 26 prior to the handoff. The part 66 of the correspondent entity place packets from the receive buffer 64 at 20 ms intervals. Thus, 15 extra packets create a 300 ms delay in the data packet stream. Note, in the Figure, that as the mobile station 12 stuffs packets, the receive buffer 64 begins to fill at the correspondent entity.

Figure 3:
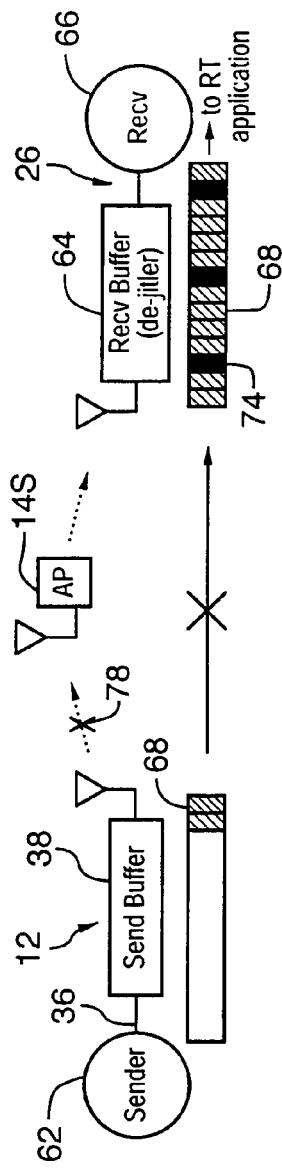

FIG. 2-3 illustrates dissociation, indicated by the X marking 78, with the source access point. The communication link is temporarily broken. Due to the stuffing of the data packets prior to the handoff of communication, the receive buffer 64 of the correspondent entity is full and continuous to supply real time data packets even though the link is broken. Also, here, the mobile station is beginning to buffer its real time packets 68 so that the packets are sent when the handoff is complete and the length returns.

Figures 2, 3, 4:
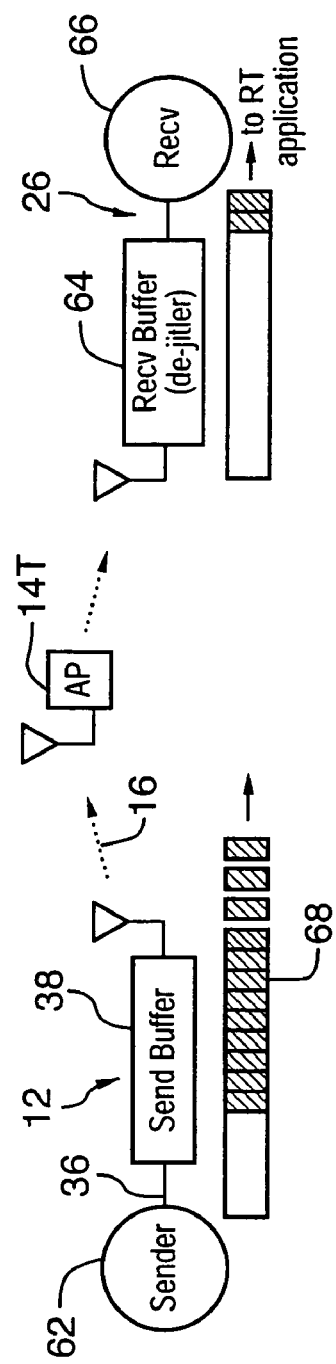

FIG. 2-4 illustrates operation subsequent to association of the mobile station with a target access point 14-T. Buffered packets 68, buffered at the send buffer 38 are communicated. When the link returns, the receive buffer 64 is almost empty. Through proper approximation of the handoff delay, real time packets delivered by the mobile stations should arrive just in time to fill the receive buffer 64 again without breaking the real time data stream playing at the correspondent entity.

FIG. 2-5 illustrates initiation of unstuffing operations subsequent to handoff to return the real time delay back to a normal delay period. Unstuffing operations are analogous to stuffing operations. During unstuffing operations, the real time data stream is compressed in time dynamically to reduce the delay. Unstuffing is performed over a large enough period of time to be transparent to the end user of the correspondent entity. Any of various stuffing and unstuffing techniques are utilized to improved the service quality levels of the communications.

The real time quality of service protocol on a return path from the unaware node back to the mobile station utilizes a slightly different approach by which also to preserve service quality levels. The unaware, correspondent entity 26 does not send out additional data packets in anticipation of a handoff as the unaware entity is oblivious to the stuffing and unstuffing protocol operations. When the correspondent entity is a wireline device, the wireline device might also be wholly unaware that communications are effectuated by way of a radio link with a mobile station. The apparatus 36 is embodied, either at a proxy server or, here, at a mobile station at which to perform the stuffing and unstuffing operations.

FIG. 3-1 illustrates communication of a real time data stream of data packets, originated at the unaware correspondent entity 26 to the mobile station 12 when the underlying 802.11 link is good. Real time packets 68 are sent at 20 ms intervals. And, both send and receive buffers 64 and 38 are empty.

FIG. 3-2 represents operation upon determination that a handoff to a target access point shall occur soon. And, stuffing operations by which the data packets 74 are stuffed into a receive buffer 46 commence. The correspondent entity is unaware of the data stuffing and the stretching of the real time data packet stream is effectuated by the apparatus 36 without knowledge by the correspondent entity of such stuffing. The amount of real time data stream stretching corresponds to the amount of time that the pending handoff shall make the link unavailable. The procedures are analogous to those shown with respect to FIG. 2-2, except that here, the buffer 46 is being stuffed.

FIG. 3-3 illustrates disassociation, again indicated at 78, of the mobile station with a serving access point, prior to association of the mobile station with a target access point. The receive buffer 46 of the mobile station is full, and the real time data packets are played while the link is down. The unaware, correspondent entity never stops sending real time packets as the unaware correspondent entity does not realize the disassociation of the mobile station with the network. All buffering is performed at the access point, indicated at 86, analogous to the buffering that occurs when a mobile station indicates to an access point that the mobile station is in a power saving mode.

FIG. 3-4 illustrates operation upon association of the mobile station with the target access point 14T. The link returns, and the handoff between the access point is complete. Buffered packets at the access point are forwarded on to the handset. The buffered data is forwarded to the target access point by way of an Inter Access Point Protocol (IAPP). The target access point, with which the mobile station is now associated, then sends the buffered data packets upon the radio link to the mobile station. This communication of the data packet fills the receive buffer 46 of the mobile station.

Figures 2, 3, 4, 5:
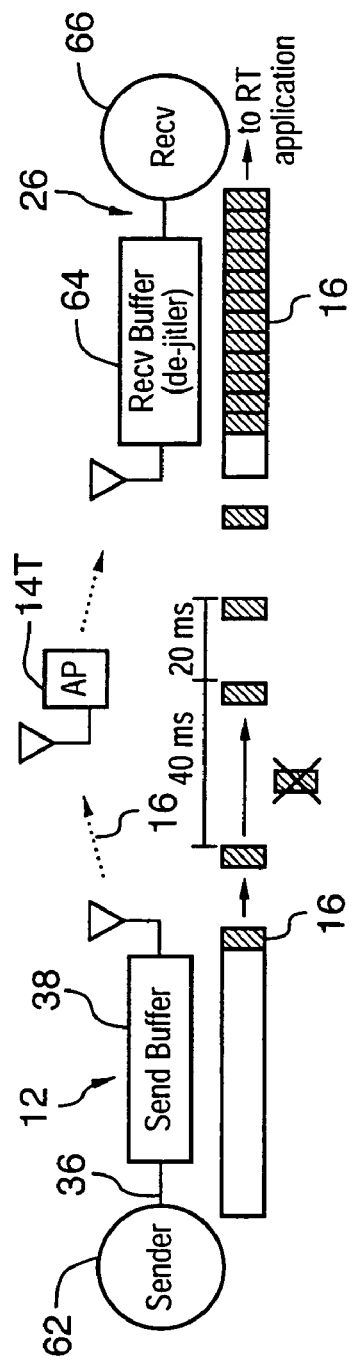
Figures 1, 3:
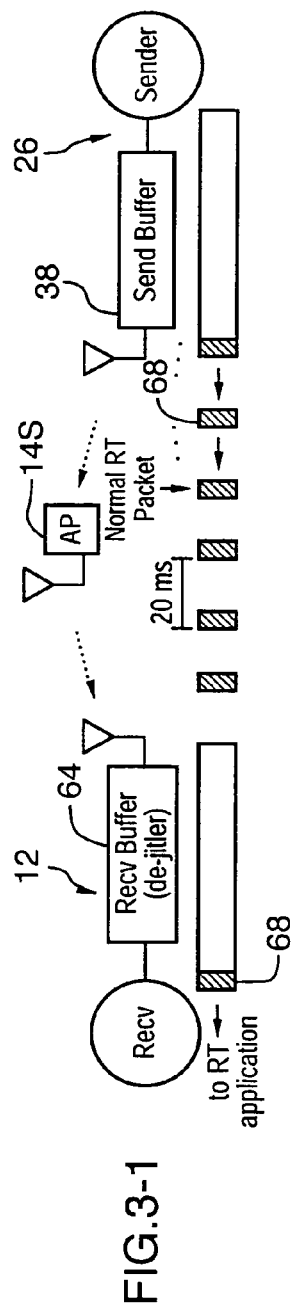
Figures 2, 3:
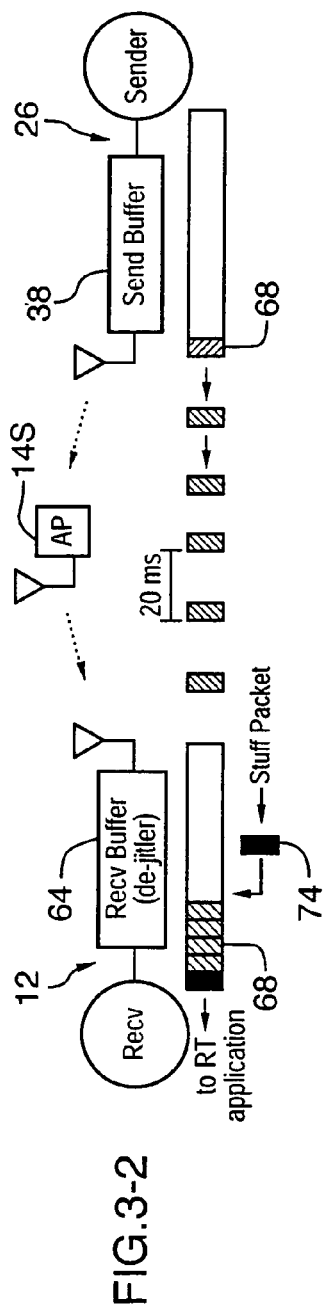
Figure 3:
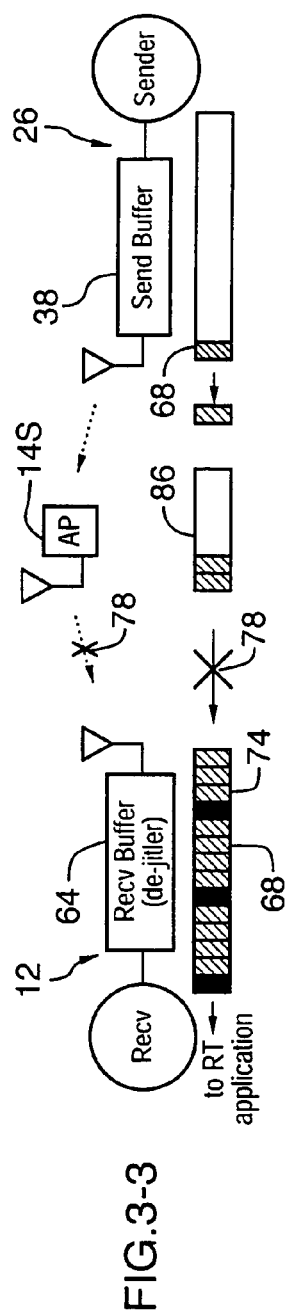

FIG. 3-5 illustrates unstuffing procedures subsequent to completion of the handoff. The unstuffing procedure compresses the real time data stream to return the delay back to normal. As the correspondent entity is unaware of the data stuffing and unstuffing operations, the unstuffing operations are performed without knowledge of the correspondent entity.

As noted in FIGS. 3-3 and 3-4, the inclusion of the access point buffer at the access point is needed as the unaware correspondent entity does not perform buffering of the data. RT QoS is maintained through the Inter Access Point Protocol entities embodied at the access point. Buffered packets are subsequently forwarded to the target access points subsequent to handoff by way of the IAPP to avoid being dropped, otherwise negating the benefits of stuffing operations. In a scenario in which IAPP does not support handing off buffered packets, a proxy device is alternately utilized at the network infrastructure for this purpose.

Stuffing and unstuffing operations stretch and compress, respectively, a real time data packet stream in time. The data packet stream is stretched by adding extra data packets at selected intervals. And, compression of the data packets stream is effectuated by removing the extra data packets.

When a mobile station, such as a mobile station 12, has decided, or has detected, that a handoff must occur, data stuffing operations commence. For instance, a determination is made that a handoff shall occur in approximately two seconds. And, the real time data traffic is flowing from the mobile station at 20 ms intervals. Additionally, for instance, the handoff shall make the channel unavailable for 200 ms. A 200 ms delay is injected into the receive buffer of the correspondent entity through the stuffing of ten packets into the data stream prior to the handoff. In two seconds, 2000 ms, the handset shall send out one hundred real time data packets. Thus, a packet must be stuffed for roughly every 10 real time data packets. Conversely, during unstuffing operations, one data packet is removed out of every ten data packets.

Various methods are available for stretching and compressing real time data. Most simply, for voice communications, every $n^{th}$ real time data packet is replicated when stuffing operations are performed. And, every $n^{th}$ data packet is dropped during unstuffing operations. Alternately, the audio is stretched-out when stuffing rather than simply repeating a data packet. To effectuate this, the mobile station resamples data to create extra real time data packets and stuffs the real time data packets into the data stream.

The stretching and compressing of the real time data packets stream is, for instance, effectuated by stuffing and unstuffing during silence periods. Voice activity detection senses an audio stream formed of a real time data stream so that the data packets that are stuffed into the real time data packet stream are stuffed therein during silence periods only. In VoIP, the silence periods correspond, e.g., between words, for a conversation, etc.

The previous descriptions are of preferred examples for implementing the invention, and the scope of the invention should not necessarily be limited by this description. The scope of the present invention is defined by the following claims:

We claim:

1. In a communication system having a mobile node that communicates a first sequence of communication data symbols pursuant to effectuation of a communication service with a network part, the network part having a serving access point with which the mobile node initially communicates and at least a first target access point with which communications continue subsequent to hand-off of communication thereto, an apparatus for facilitating improved perceived service quality levels of communication during hand-off of the communication from the serving access point to the target access point, said apparatus comprising:

a data sequence expander adapted to receive indications of pendency of the hand-off of the communications and to receive representations of the first sequence of the communication data symbols communicated pursuant to the effectuation of the communication service, said data sequence expander adding expanded data symbols to the first sequence of the communication data symbols responsive to detections of the indications of the pendency of the hand-off of the communications, thereby to form a first expanded sequence;

wherein the data sequence expander approximates an amount of time prior to occurrence of the hand-off and selects a number of expanded data symbols to add to the first sequence so that the selected number of expanded data symbols causes a delay that corresponds to the amount of time prior to occurrence of the hand-off.

2. The apparatus of claim 1 wherein the first sequence of the communication data is organized at the mobile node, and wherein said data sequence expander is embodied at the mobile node.

3. The apparatus of claim 1 wherein the network part comprises a proxy device and wherein said data sequence expander is embodied at the proxy device.

4. The apparatus of claim 1 wherein the communication service in effectuated between the mobile node and the correspondent node, wherein the first sequence of the communication data symbols is originated at the correspondent node, and wherein said data sequence expander is positioned remote from the correspondent node.

5. The apparatus of claim 4 wherein said data sequence expander is embodied at the mobile node.

6. The apparatus of claim 4 wherein the network part comprises a proxy device and wherein said data sequence expander is embodied at the proxy device.

7. The apparatus of claim 1 further comprising a resampler adapted to receive the representation of the first sequence of the communication data symbols, said resampler selectably for resampling selected portion of the first sequence of the communication data symbol and for forming the expanded data symbols therefore.

8. The apparatus of claim 7 wherein selected symbols of the first sequence of the communication data symbols define silence periods and wherein the expanded data symbols are of symbols values corresponding to values of the selected symbols that define the silence periods.

9. The apparatus of claim 8 wherein the expanded data symbols formed by said resampler are concatenated to the data symbols of the first sequence of the communication data symbols that define the silence periods.

10. The apparatus of claim 1 wherein a second sequence of communication data symbols is further communicated pursuant to the effectuation of the communication service, the second sequence forming a second expanded sequence and wherein said apparatus further comprises a data sequence contractor adapted to receive representations of the second sequence of the communication data symbols, said data sequence contractor selectably for removing expanded data symbols out of the second sequence.

11. The apparatus of claim 10 wherein said data sequence contractor is further adapted to receive the indications of the pendency of the hand-off of the communications, the expanded data symbols removed out of the second sequence responsive to detection of the indications of the pendency of the hand-off of the communication.

12. The apparatus of claim 11 wherein said data sequence contractor is embodied at the mobile node.

13. The apparatus of claim 11 wherein the network part comprises a proxy device and wherein said data sequence expander is embodied at the proxy device.

14. The apparatus of claim 1 wherein the communication service is effectuated with a correspondent node and wherein the hand-off of communications, indications of the pendency thereof are provided to said data sequence expander, is effectuated free of interaction with the correspondent node.

15. In a radio communication system having at least a first communication station for communicating a first sequence of data, the data being a selected multiple of a first data length and of a second data length, the first data length a fractional portion of the second data length, a method for operating upon the data at an RLP (Radio Link Protocol) logical layer of at least the first communication station, said method comprising:

detecting pendency of the hand-off of the communication from the serving access point to the first target access point;

approximating an amount of time prior to occurrence of the hand-off;

selecting a number of expanded data symbols to add to the first sequence such that the selected number of expanded data symbols will cause a delay that corresponds to the amount of time prior to occurrence of the hand-off; and adding the expanded data symbols to the first sequence of the communication data responsive to detection of the pendency of the hand-off of communications, thereby to form a first expanded data sequence.

16. The method of claim 15 wherein the expanded data symbols are added during said operation of selectably adding to increase the first sequence to be of a length at least corresponding to an anticipated hand-off interruption period.

17. The method of claim 15 further comprising the operation of removing the expanded data symbols added to the first sequence during said operation of selectably adding.

18. The method of claim 15 further comprising the operation of buffering the first expanded sequence at a jitter buffer.

19. The method of claim 18 further comprising the operation of retrieving the first expanded sequence the jitter buffer to effectuate the communication service during hand-off of the communications to the target access point.

20. The method of claim 15 wherein the communication system comprises an IEEE 802.11 compliant communication system and wherein the first sequence of the data to which the expanded data symbols comprise packet data, formatted pursuant to a packet formatting scheme permitted to be communicated in the IEEE 802.11 compliant communication system.

\* \* \* \* \*

UNITED STATES PATENT AND TRADEMARK OFFICE
CERTIFICATE OF CORRECTION

PATENT NO. : 7,773,561 B2  Page 1 of 1
APPLICATION NO. : 10/915994
DATED : August 10, 2010
INVENTOR(S) : Kezys et al.

It is certified that error appears in the above-identified patent and that said Letters Patent is hereby corrected as shown below:

Title Page, Item (75) Inventors:

Please replace "Vytautus Robertas Kezys" with -- Vytautas Robertas Kezys --

Signed and Sealed this

Fifth Day of October, 2010

David J. Kappos
*Director of the United States Patent and Trademark Office*